US010445170B1

(12) United States Patent
Subramanian et al.

(10) Patent No.: US 10,445,170 B1
(45) Date of Patent: Oct. 15, 2019

(54) DATA LINEAGE IDENTIFICATION AND CHANGE IMPACT PREDICTION IN A DISTRIBUTED COMPUTING ENVIRONMENT

(71) Applicant: FMR LLC, Boston, MA (US)

(72) Inventors: Gopalakrishnan Subramanian, Acton, MA (US); Srinivas Gururaja Rau, Bangalore (IN); Bhanu Prashanthi Murthy, Bangalore (IN); Ankan Pal, Bangalore (IN); Akhilesh Raghavendrachar Srinivasachar Kaddi, Karnataka (IN); Ralph Hollinshead, Cary, NC (US); Shankar Vaidhyanathan, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/197,774

(22) Filed: Nov. 21, 2018

(51) Int. Cl.
| | |
|---|---|
| *G06F 11/00* | (2006.01) |
| *G06F 11/07* | (2006.01) |
| *G06N 20/10* | (2019.01) |
| *G06F 16/33* | (2019.01) |
| *G06F 16/25* | (2019.01) |
| *G06F 16/35* | (2019.01) |

(52) U.S. Cl.
CPC ........ *G06F 11/079* (2013.01); *G06F 11/0709* (2013.01); *G06F 11/0751* (2013.01); *G06F 11/0778* (2013.01); *G06F 11/0793* (2013.01); *G06F 16/254* (2019.01); *G06F 16/3347* (2019.01); *G06F 16/355* (2019.01); *G06N 20/10* (2019.01)

(58) Field of Classification Search
CPC .............. G06F 11/079; G06F 11/0778; G06F 11/0784; G06F 11/0793; G06F 11/3447; G06F 11/3452
See application file for complete search history.

(56) References Cited

U.S. PATENT DOCUMENTS

| | | | | |
|---|---|---|---|---|
| 8,301,613 B2 * | 10/2012 | Grabarnik | ............ | G06Q 10/103 707/706 |
| 8,341,178 B2 * | 12/2012 | Belknap | ................ | G06F 16/217 707/769 |
| 8,762,777 B2 * | 6/2014 | Gotoh | ................... | G06F 11/079 714/25 |

(Continued)

*Primary Examiner* — Elmira Mehrmanesh
(74) *Attorney, Agent, or Firm* — Proskauer Rose LLP

(57) ABSTRACT

Methods and systems are described for data lineage identification and change impact prediction. Servers capture metadata that defines data objects associated with data sources. The servers determine direct relationships between data sources based upon the captured metadata. The servers identify indirect relationships between the data sources. The servers generate a data lineage across the data sources for the data objects. The servers extract unstructured text from database incident tickets and match the unstructured text to the metadata. The servers generate a multidimensional vector for the data objects based upon the data lineage and the unstructured text. The servers train a classification model using the vectors to predict a change impact score for each data object. The servers receive a request to change a data object. The servers determine a change impact score for the data object. When the score is below a threshold, the servers execute the change.

22 Claims, 12 Drawing Sheets

(56) References Cited

U.S. PATENT DOCUMENTS

| | | | |
|---|---|---|---|
| 9,299,031 B2* | 3/2016 | Jan | G06N 5/048 |
| 2007/0192078 A1* | 8/2007 | Nasle | G05B 23/0254 |
| | | | 703/14 |
| 2010/0082620 A1* | 4/2010 | Jennings, III | G06F 16/285 |
| | | | 707/736 |
| 2010/0318846 A1* | 12/2010 | Sailer | G06F 11/0748 |
| | | | 714/26 |
| 2012/0066547 A1* | 3/2012 | Gilbert | H04L 41/065 |
| | | | 714/26 |
| 2014/0129536 A1* | 5/2014 | Anand | G06Q 10/0635 |
| | | | 707/706 |
| 2015/0012478 A1 | 1/2015 | Mohammad et al. | |
| 2015/0347193 A1 | 12/2015 | Wolfson et al. | |
| 2016/0125057 A1 | 5/2016 | Gould et al. | |
| 2017/0012834 A1* | 1/2017 | Chan | G06F 9/4881 |
| 2017/0091665 A1 | 3/2017 | Sanchez et al. | |
| 2017/0109418 A1 | 4/2017 | Bartlett et al. | |
| 2018/0004833 A1 | 1/2018 | Mukherjee et al. | |
| 2018/0067732 A1 | 3/2018 | Seetharaman et al. | |

* cited by examiner

| Incident Number | Date Time | Severity | Brief Description | Description | Resolution | Product Line |
|---|---|---|---|---|---|---|
| 123 | 12/8/2016 | 3-High | ... | ...A subset of systems will undergo changes because job J1 will update the Database D1 Table 1 with values "22/7/2017" in the column A1.... | ... | ABC |
| 456 | 1/1/2017 | 4-Medium | ... | ...J2 ran and failed due to some error caused while inserting records in Table T2, column A2... | ... | DEF |
| 654 | 2/2/2017 | 4-High | ... | ... | ... | ABC |

FIG. 3A

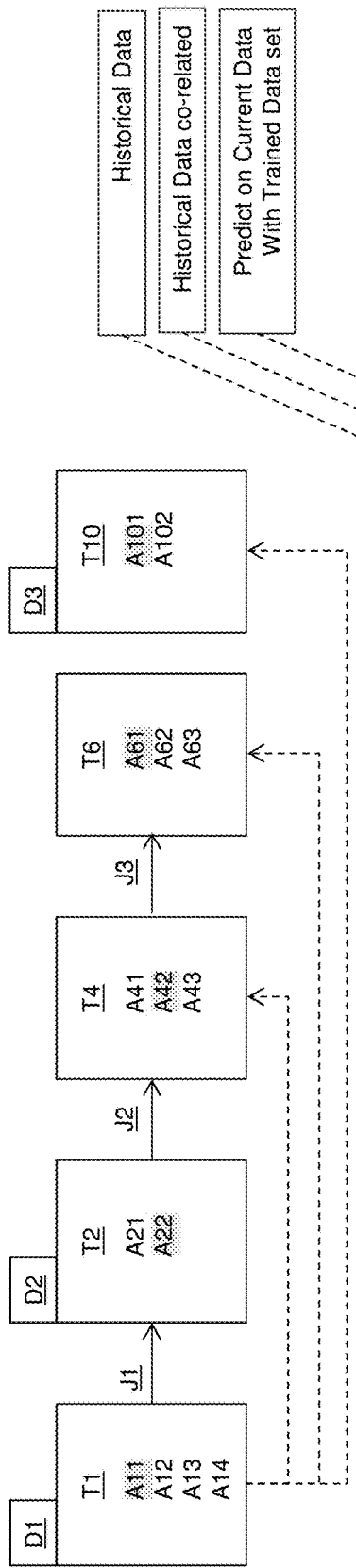

- Change Ticket C123 inserted some value into T1.A11 on 8/12/2016
- The daily batch cycle is a 24-hour cycle meaning within the 24 hours all necessary processing is completed successfully
- If incident I123 was raised on 8/13/2016 while Job J2 was trying to update T4.A42 with a value "Y", our model can infer that *because T4.A42 has a relationship to T1.A11 (Data Lineage as shown above)*, hence I123 was a result of C123
- This forms the Trained Dataset which allows the system to connect various disparate incident & change information with the existing data lineage information to build up potential cause – effect nodes
- If change C234 is initiated on 8/25/2018 on T1.A11 -> the system predicts that this change will likely impact Job J2 to fail during the next batch cycle

| Change/Incident (t) | Text Extracted Information (Output of Step 2) | Date Time | Severity | Table Name | Column Name | Operation Type | Issue (Y/N) | Failure Object | Parent Incident/Change |
|---|---|---|---|---|---|---|---|---|---|
| C123 | Insert into T1.A11 value "X" | 12/8/2016 | NA | T1 | A11 | Insert | No | | |
| I123 | Update into T4.A42 value "Y" | 13/8/2016 | 4-Medium | T4 | A42 | Update | Y | J2 Alert Possible Impact | C123 |
| C234 | Insert into T1.A11 value "Z" | 25/8/2018 | NA | T1 | A11 | Insert | Y | | |
| I456 | Update into T2.A22 value "M" | 14/7/2015 | 3-H | T2 | A22 | Update | Y | Jx Alert Possible Impact | I789 |
| C567 | Update into T1.A11 value "N" | 26/8/2016 | NA | T1 | A11 | Update | | | |

FIG. 3C

| Change (C) / Incident (I) | Text Extracted Information (Output of Step 2) | Date Time | Severity | Table Name | Column Name | Operation Type | Issue (Y/N) | Failure Object | Parent Incident/ Change |
|---|---|---|---|---|---|---|---|---|---|
| C123 | Insert into T1.A11 value "X" | 12/8/2016 | NA | T1 | A11 | Insert | No | | |
| I123 | Update into T4.A42 value "Y" | 13/8/2016 | 4-Medium | T4 | A42 | Update | Y | J2 | C123 |
| C234 | Insert into T1.A11 value "Z" | 25/8/2018 | NA | T1 | A11 | Insert | Alert Possible Impact | | |

FIG. 3D

| CI Name | Dependent Object Name | Type of relationship | Depth | | Impact | | | | |
|---|---|---|---|---|---|---|---|---|---|
| | | | Level of the dependent object(D) | Logistic regression Score (S) | Pvalue for highest Confidence (P) | Number of Direct (N) | Weightage (W) | X=(S*P*N*W)/D | Rank |
| Script1.typ e.t1 | J.t1 | Direct | 1 | 0.8 | 0.9 | 1 | 0.91 | 0.6561 | 3 |
| J.t1 | J.t2 | Indirect | 1 | 0.9 | 0.98 | 1 | 0.91 | 0.81 | 1 |
| Type.t1 | T4.a.t1 | Direct | 1 | 0.9 | 0.95 | 1 | 0.82 | 0.73 | 2 |

FIG. 5

DATA LINEAGE IDENTIFICATION AND CHANGE IMPACT PREDICTION IN A DISTRIBUTED COMPUTING ENVIRONMENT

TECHNICAL FIELD

This application relates generally to methods and apparatuses, including computer program products, for data lineage identification and change impact prediction in a distributed computing environment.

BACKGROUND

Generally, enterprise computing environments involve a plurality of distributed computing devices that coordinate over a network to execute one or more applications in one or more domains for the enterprise. For example, an enterprise computing environment may include a web-facing application (or portal) that communicates with an authentication server to validate logins to the application, a business intelligence (BI) database that stores relevant information used by the application, a web services application server that provides connectors to other computing devices and application workflow functionality, one or more low-level databases or data stores that provide data to the application, and so forth. Each of these computing elements may comprise data objects that store data used by the enterprise system, and the same or similar data objects may be used by multiple data sources—i.e., data may be ingested by the enterprise system by a first data source, when then relays all (or a portion of) the data object to other data sources in the system—such that a data object may be used by many different data sources as part of the application. The data flow connections between different data sources that involve the data object is known as a data lineage.

However, it is typically difficult to understand end-to-end data lineage information in large production computing systems for several reasons. First, such systems usually have incomplete (or missing) end-to-end data object information—as more complex applications are built, it becomes harder to keep track of how data is disseminated in the system. Second, there may be multiple formats for representing metadata about data sources or data objects in the production system—and such formats cannot easily be reconciled. Third, there is typically a lack of connection between terminology used at the application level and technical data used at the data source level—so changes to a high-level application cannot be assessed to determine potential impact on data objects or sources.

Existing solutions (such as Becubic™ from ASG Technologies, or Collibra™) have limited capability to perform data lineage, but typically do not leverage heterogeneous and/or unstructured data and metadata relating to the specific data sources and data objects in a system to assess and rank data object change impact in view of relationships between data sources, or depth (or distance) of an impacted data object from its input data source. In addition, such solutions do not use advanced machine learning algorithms and techniques to advantageously self-learn using existing data lineage information in conjunction with incident tickets (arising from data object errors) to discover both indirect relationships between data sources and assess the likelihood of failure if a data object is changed. As a result of the above deficiencies, there is no meaningful way to perform data lineage identification and data object change impact analysis in a production computing system.

SUMMARY

The methods and systems described herein beneficially overcome the deficiencies noted above to leverage unstructured computer data and technical attributes of data objects and data sources to identify data lineage of said objects across multiple different data sources in a production computing environment and to assess the impact of data object changes to the environment by analyzing aspects of the data lineage using advanced artificial intelligence classification algorithms. The techniques described herein provide several significant technical advantages over existing data lineage analysis computing systems, including the capability to load a data lineage and provide corresponding details seamlessly for any new module or technological platform integrated into the overall system, with minimal configuration and no changes to the base component(s) required. In addition, the methods and systems enable identification of technology use across an enterprise landscape, which helps in analyzing systems and applications impacted during a technology change, upgrade, or decommissioning. Further, the techniques provide identification of unused data or data objects which enables removal of unused elements, helps with code cleanup and maintenance of the data ecosystem. Finally, the methods and systems provided herein allow for easy and efficient identification of new data element procurement at an enterprise level.

The invention, in one aspect, features a system for data lineage identification and change impact prediction in a distributed computing environment. The system comprises a plurality of distributed server computing devices that coordinate over a network to capture metadata associated with each of a plurality of data sources coupled to the plurality of distributed server computing devices, the metadata comprising technical attributes that define data objects stored in the plurality of data sources. The plurality of distributed server computing devices determine one or more direct relationships between one or more of the data objects in the plurality of data sources based upon the captured metadata. The plurality of distributed server computing devices identify, using an artificial intelligence machine learning model on the metadata, one or more indirect relationships between one or more of the data objects in the plurality of data sources for which a direct relationship is not determined. The plurality of distributed server computing devices generate a data lineage across the plurality of data sources for one or more of the data objects in the plurality of data sources using the direct relationships and the indirect relationships, the data lineage comprising one or more data flow connections between an input data source, one or more intermediate data sources, and a target data source. The plurality of distributed server computing devices extract unstructured text from one or more stored database incident tickets, the unstructured text comprising error messages associated with one or more of the data objects stored in the plurality of data sources and match the unstructured text to the metadata for the data objects. The plurality of distributed server computing devices generate a multidimensional vector for one or more of the data objects stored in the plurality of data sources based upon the data lineage and the unstructured text, the multidimensional vector comprising a change impact feature set for the data objects. The plurality of distributed server computing devices train a change classification model using the multidimensional vectors to predict a change impact score for each data object and rank the data objects based upon the change impact scores. The plurality of distributed server computing devices receive a request to change a data object stored in one of the data sources. The plurality of distributed server computing devices determine, by executing the change classification model, a change impact score for the data object identified in the request. When the change impact score is below a predetermined threshold, the plurality of distributed server computing devices execute the requested change by generating programmatic instructions that are transmitted to the data source that stores the data object identified in the request, wherein the data source executes the programmatic instructions to change one or more of a data structure or a data type of the data object.

The invention, in another aspect, features a computerized method of data lineage identification and change impact prediction in a distributed computing environment. A plurality of distributed server computing devices coordinate over a network to capture metadata associated with each of a plurality of data sources coupled to the plurality of distributed server computing devices, the metadata comprising technical attributes that define data objects stored in the plurality of data sources. The plurality of distributed server computing devices determine one or more direct relationships between one or more of the data objects in the plurality of data sources based upon the captured metadata. The plurality of distributed server computing devices identify, using an artificial intelligence machine learning model on the metadata, one or more indirect relationships between one or more of the data objects in the plurality of data sources for which a direct relationship is not determined. The plurality of distributed server computing devices generate a data lineage across the plurality of data sources for one or more of the data objects in the plurality of data sources using the direct relationships and the indirect relationships, the data lineage comprising one or more data flow connections between an input data source, one or more intermediate data sources, and a target data source. The plurality of distributed server computing devices extract unstructured text from one or more stored database incident tickets, the unstructured text comprising error messages associated with one or more of the data objects stored in the plurality of data sources and match the unstructured text to the metadata for the data objects. The plurality of distributed server computing devices generate a multidimensional vector for one or more of the data objects stored in the plurality of data sources based upon the data lineage and the unstructured text, the multidimensional vector comprising a change impact feature set for the data objects. The plurality of distributed server computing devices train a change classification model using the multidimensional vectors to predict a change impact score for each data object and rank the data objects based upon the change impact scores. The plurality of distributed server computing devices receive a request to change a data object stored in one of the data sources. The plurality of distributed server computing devices determine, by executing the change classification model, a change impact score for the data object identified in the request. When the change impact score is below a predetermined threshold, the plurality of distributed server computing devices execute the requested change by generating programmatic instructions that are transmitted to the data source that stores the data object identified in the request, wherein the data source executes the programmatic instructions to change one or more of a data structure or a data type of the data object.

Any of the above aspects can include one or more of the following features. In some embodiments, the plurality of data sources comprise at least one of databases, entity relationship models, extract transform and load (ETL) systems, extract load and transform (ELT) systems, business intelligence reporting systems, and web configuration systems. In some embodiments, the direct relationships comprise a data flow connection associated with a data object from a first data source to a second data source. In some embodiments, the indirect relationships comprise a data flow connection associated with a data object from a first data source to a second data source via one or more intermediate data sources between the first data source and the second data source.

In some embodiments, the artificial intelligence machine learning model used to identify one or more indirect relationships comprises a Bayesian network model. In some embodiments, the change impact feature set is based upon the relationships in the data lineage associated with the data object, a depth of the data object in the data lineage, and the database incident tickets associated with the data object. In some embodiments, the change classification model is a multinomial regression model.

In some embodiments, the plurality of distributed server computing devices uses the data lineage to identify a mismatch between a data object in a first data source of a relationship and a data object in a second data source of a relationship. In some embodiments, the mismatch comprises one or more of: a data type mismatch, a size mismatch, or an attribute mismatch.

In some embodiments, determining a change impact score for the data object identified in the request comprises: capturing metadata associated with the data object identified in the request; generating a multidimensional vector for the data object identified in the request based upon a data lineage of the request and unstructured text extracted from the stored database incident tickets; and executing the change classification model using, as input to the change classification model, the multidimensional vector for the data object identified in the request to predict a change impact score for the data object. In some embodiments, the plurality of distributed server computing devices train the change classification model using the input vector and the predicted change impact score as feedback.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3A is an exemplary table showing a data structure for incident data in the repository.

FIG. 3C is an exemplary diagram showing how trained data is generated and then used by the system to predict impact of subsequent incident ticket information.

FIG. 3D is an exemplary diagram showing how trained data is clustered to identify potential impacts.

FIG. 5 is an exemplary ranking of change impacts.

DETAILED DESCRIPTION

Figure 1A:
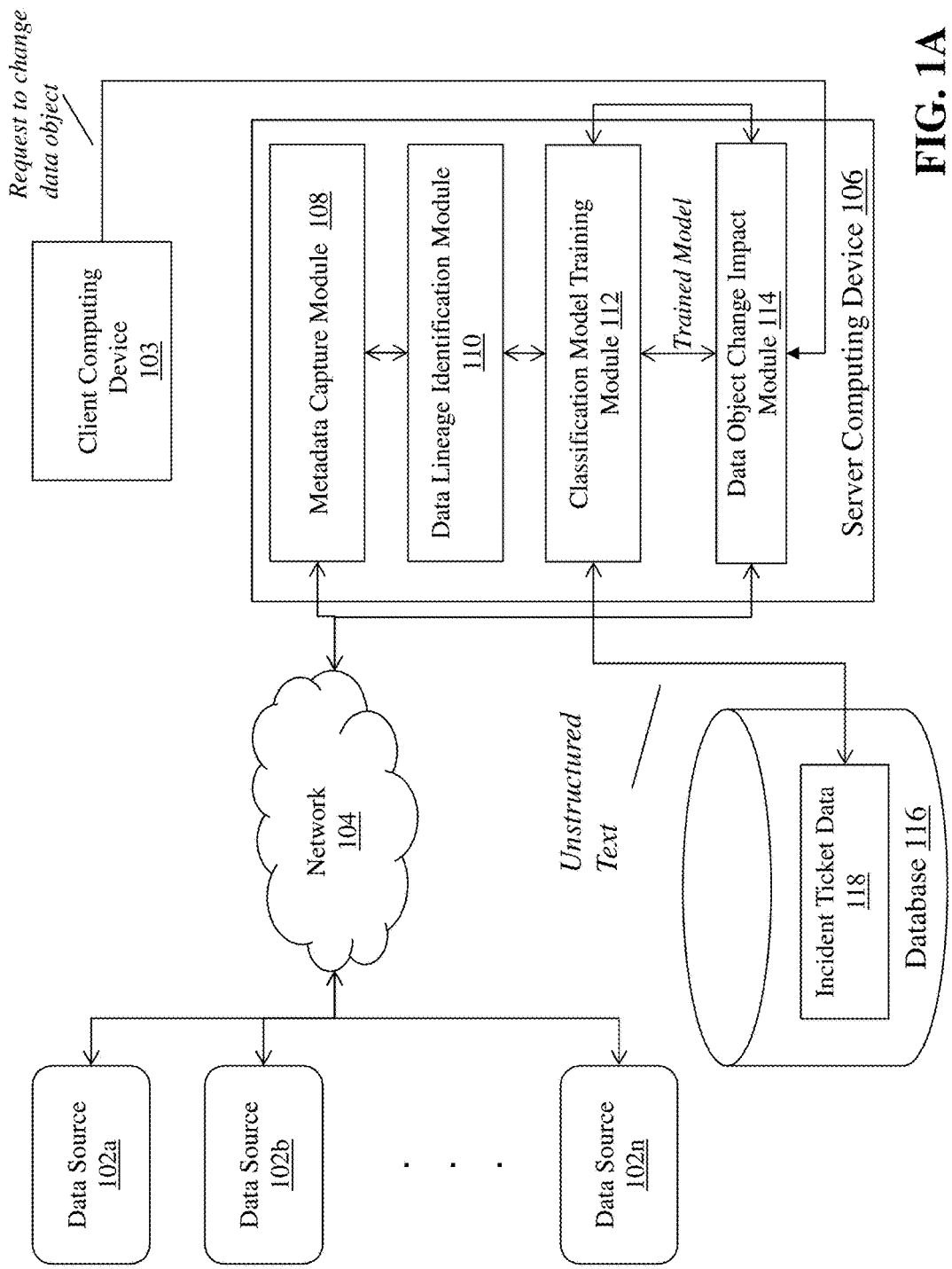
FIG. 1A is a block diagram of a system for data lineage identification and change impact prediction in a distributed computing environment.

FIG. 1A is a block diagram of a system for data lineage identification and change impact prediction in a distributed computing environment. The system 100 includes a plurality of data sources 102a-102n, a client computing device 103, a communications network 104, a server computing device 106 comprising a metadata capture module 108, a data lineage identification module 110, a classification model training module 112, and a data object change impact module 114, and a database 116 that stores incident ticket data 118.

The data sources 102a-102n are computing devices that connect to the communications network 104 in order to communicate with the server computing device 106 to enable the modules of server computing device 106 to receive metadata associated with one or more data objects stored in the data sources 102a-102n relating to the process of data lineage identification and change impact prediction in a distributed computing environment as described herein. In addition, the data sources 102a-102n receive programmatic instructions from the server computing device 106 that comprise one or more changes to the data objects stored in the data sources 102a-102n based upon the data lineage identification and change impact prediction described herein. In some embodiments, the data sources 102a-102n are systems and/or repositories that store data objects used in an enterprise software application architecture, including but not limited to: databases, entity relationship models, extract transform and load (ETL) systems, extract load and transform (ELT) systems, business intelligence reporting systems, and web configuration systems. Data objects can include data structures (i.e., tables, fields), variables, functions, methods, and other types of values used to embody data in an enterprise system. Typically, data objects are referenced and/or used across multiple data sources in an enterprise environment—for example, data may be captured by a first data source and stored in a data object there, then the first data source may transmit the data object (or portions of it) to one or more downstream data sources as part of an enterprise transaction or software application functionality. This data flow can happen a number of times for a particular data object, such that a data lineage for the data object can be determined—that is, an entry point data source for one or more data fields that comprise the data object, one or more intermediate data sources through which the data object passes, and a target data source that consumes the data object from upstream data source(s). It should be appreciated that a data object can be consumed by more than one data source as part of the overall data lineage, and that portions of a data object (e.g., a field of a database table) can be distributed to multiple different data sources as part of the overall data lineage.

The data flow can comprise one or more direct relationships, and/or one or more indirect relationships, between data sources. For example, direct relationships between data sources can comprise a data flow connection associated with a data object from a first data source to a second data source. Indirect relationships between data sources can comprise a data flow connection from a first data source to a second data source via one or more intermediate data sources between the first data source and the second data source. The data flow connection can be a physical connection (e.g., network path connecting two computing devices that host data sources) and/or a logical connection (e.g., two computing devices in the same address space that route data to each other).

The system of FIG. 1A includes a client computing device 103 in communication with server computing device 106 for the purpose of, e.g., submitting data object change impact requests as will be described herein. Exemplary client devices 103 include but are not limited to desktop computers, laptop computers, tablets, mobile devices, smartphones, and internet appliances. It should be appreciated that other types of computing devices that are capable of connecting to the components of the system of FIG. 1A can be used without departing from the scope of invention. Although FIG. 1A depicts a single client device 103, it should be appreciated that the system of FIG. 1A can include any number of client devices. And as mentioned above, in some embodiments the client device 103 also includes a display for receiving data from the server computing device 106 and/or the database 116 and displaying data to a user of the client device 103.

The communication network 104 enables the other components of the system 100 to communicate with each other in order to perform the process of data lineage identification and change impact prediction in a distributed computing environment as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system of FIG. 1A to communicate with each other.

The server computing device 106 is a computing device (or in some embodiments, a set of computing devices) that comprises a combination of hardware, including one or more processors and one or more physical memory modules, and specialized software engines and models that execute on the processor of the server computing device 106, to receive data from other components of the system 100, transmit data to other components of the system 100, and perform functions for data lineage identification and change impact prediction in a distributed computing environment as described herein. As mentioned above, the processor of the server computing device 106 executes a metadata capture module 108, a data lineage identification module 110, a classification model training module 112, and a data object change impact module 114.

In some embodiments, the modules 108, 110, 112, and 114 are specialized sets of computer software instructions programmed onto a dedicated processor in the server computing device 106 and can include specifically-designated memory locations and/or registers for executing the specialized computer software instructions. Although the modules 108, 110, 112, and 114 are shown in FIG. 1A as executing within the same server computing device 106, in some embodiments the functionality of the modules 108, 110, 112, and 114 can be distributed among a plurality of server computing devices. As shown in FIG. 1A, the server computing device 106 enables the modules 108, 110, 112, and 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112, and 114 is described in detail below.

The database 116 is a computing device (or in some embodiments, a set of computing devices) that is coupled to the server computing device 106 and is configured to receive, generate, and store specific segments of data relating to the process of data lineage identification and change impact prediction in a distributed computing environment as described herein. In some embodiments, all or a portion of the database 116 can be integrated with the server computing device 106 or be located on a separate computing device or devices. For example, the database 116 can comprise one or more databases, such as MySQL™ available from Oracle Corp. of Redwood City, Calif. The database 116 includes incident ticket data 118.

The incident ticket data 118 comprises unstructured computer text received and stored by the database 116 via input from a web site/web page, or the unstructured text is received and stored directly into the database 116 by utilizing a first computer file (e.g., XML, CSV, TXT). For example, a user at a remote computing device can utilize a GUI provided by the remote computing device to select and/or input the unstructured computer text (e.g. directly and/or as a computer file) and transmit the text to the database 116. In another example, the database 116 can retrieve the unstructured text from one or more repositories and/or computing systems (e.g., as a data feed and/or a file), such as a software development issue tracking system (e.g., JIRA from Atlassian), a software testing quality assurance (QA) bug tracking system, or other software/networking system data management systems. The incident ticket data relates to errors or issues relating to data objects in one or more data sources during execution of an application workflow in the system. For example, if a data source such as intermediate data source 202b receives a data object from input data source 202a that is not formatted properly, is of an unknown data type, or so forth, the intermediate data source 202b can generate an error message (e.g., by writing to an error log file) that is converted into an incident ticket. The incident ticket can comprise unstructured text including the error message. In some embodiments, the incident ticket includes metadata (e.g., data source identifier, data object identifier, application workflow identifier, and the like) relating to the error.

In some embodiments, the unstructured text can be delimited, meaning that each word or phrase is separated by a specific delimiter or set of delimiters (e.g., an asterisk or a semi-colon) in order for the system of FIG. 1A to quickly and efficiently segment the entire corpus of unstructured computer text into individual segments. It should be appreciated that, based upon the content of the unstructured text, the system 100 can use a delimiter that is unique or does not regularly appear in the unstructured text to ensure that the unstructured text is not erroneously parsed. Upon receiving the unstructured computer text from the various sources, the database 116 stores the text as an incident ticket for retrieval and use by the server computing device 106 as described below.

Figure 1B:
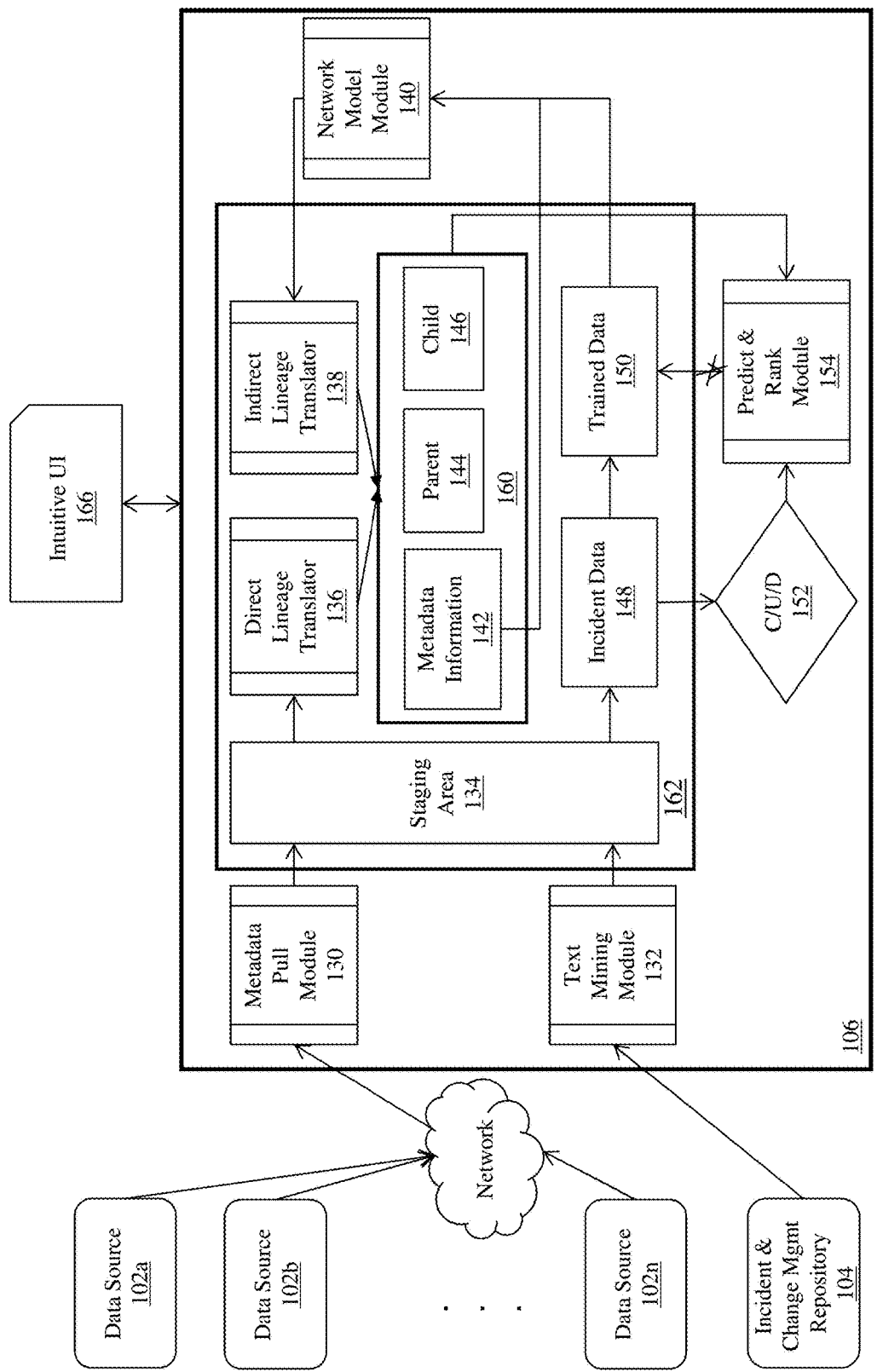
FIG. 1B is a detailed block diagram of a system for data lineage identification and change impact prediction in a distributed computing environment.

FIG. 1B is a detailed block diagram of a system for data lineage identification and change impact prediction in a distributed computing environment. The system of FIG. 1B includes data sources 102a-102n (as described above), a communications network 104 (as described above), an incident and change management repository 104, a server computing device 106 comprising a plurality of software modules, including: a metadata pull module 130; a text mining module 132; a metadata capture module 162 that includes a staging area module 134, a direct lineage translator 136, an indirect lineage translator 138, a metadata model 160 with metadata information 142, parent data 144, and child data 146, incident data 148 and trained data 150; a network model module 140; a Create/Update/Delete (CUD) trigger module 152; and a predict and rank module 154. The system of FIG. 1B includes an intuitive UI module 166 that is coupled to the server computing device 106. These modules help build data lineage (direct, indirect) as well as predict & rank impact based on incident and change tickets. Further description of each of these modules of FIG. 1B is set forth below.

The metadata pull module 130 pulls the metadata and data attributes of interest from disparate data sources (i.e., data sources 102a to 102n) and loads them into the staging area module 134 (which is within the metadata capture module 162). In some embodiments, the data pull performed by the module 130 can be done ad-hoc (i.e., on demand) or can be scheduled periodically (e.g., weekly/monthly). By doing this data pull, the module 103 ensures that the system of FIG. 1B is refreshed with the latest metadata and attributes within the overall computing ecosystem.

As noted above, the metadata capture module 162 includes several modules:

Staging area module 134 is a data storage area where source aligned data of interest (e.g., metadata objects and attributes, and incident details) are stored for further processing. For example, the metadata pull module 130 can store data pulled from the data sources 102a-102n in the staging area module 134. In some embodiments, the staging area module 134 comprises a memory module or device (e.g., RAM, disk space) that stores the data locally on the server computing device 106.

The metadata model 160 is a set of data that describes and defines the metadata objects contained within the disparate data sources 102a-102n of the computing environment. For example, the metadata information 142 is a data repository that contains data elements relating to various metadata objects that are contained within the disparate data sources 102a-102n. Parent data 144 and child data 146 are data repositories that define and describe, e.g., one or more logical relationships between the metadata objects in data sources 102a-102n. For example, the parent data 144 and child data 146 can comprise data elements such as definitions that metadata object One is a parent of metadata object Two, metadata object Three is a child of metadata object Two, and so on. The metadata information 142, parent data 144 and child data 146 enables the system to conduct a logical build-up of data object lineage—which can be displayed graphically or otherwise (e.g., through intuitive user interface 166).

In some embodiments, the metadata information 142 comprises master metadata, object metadata, and attribute metadata. Master metadata can be, e.g., ID of database server that stores the data object, ID of file server that stores the data object, etc. Object metadata can be, e.g., ID of database table or Informatica workflow that comprises the data object. Attribute metadata can be, e.g., data about one or more database columns, Informatica ETL session, field in a file, etc. within the data object. The metadata information 142 captures the properties (e.g., property of a table can be the primary key, partition, etc.) and classifications (e.g., classification can be a type, such as 'server', 'database', 'table', 'workflow', etc.) across the master metadata, object metadata, and attribute metadata. The metadata information 142 is then used to construct the parent data 144 and child data 146 relationships—which comprise data lineage information.

Incident data 148 is a data repository of key information related to incidents retrieved from the incident and change management repository 104. In some embodiments, the repository 104 has many types of information related to data incidents, errors, changes, and the like.

Trained data 150 is built by the system of FIG. 1B using the incident data 148. The trained data 150 enables the system to predict impact or rank impact points (i.e., of changes to the metadata objects) over a period of time. In some embodiments, the trained data 150 is built over a period of time by the predict and rank module 154.

The predict and rank module 154 is a machine-learning-based module that implements supervised learning techniques on existing incident data to build training data that enables the system to predict impact and rank impact scores of changes to data objects based on depth, weight and probability. The module 154 includes a feedback loop to continually learn and update the trained data to increase the accuracy of prediction of an impact based on ranks. The module 154 takes the following data elements as inputs (further detail on the operation of the predict and rank module 154 is provided later in this specification):

i. Incident triggers from the C/U/D module 152—such as when a new data attribute of a metadata object is created, an existing data attribute of a metadata object is updated or deleted, and so forth);
  ii. Metadata information 142 for existing metadata objects;
  iii. Parent data 144 and child data 146 for existing metadata objects.

The direct lineage translator 136 pulls data from the staging area module 134, parses and stores the data into the metadata repositories, i.e., metadata information 142, parent data 144 and child data 146. The translator 136 defines the direct relationships between data objects that are necessary for the system of FIG. 1B to understand data lineage.

The indirect lineage translator 138 receives or updates data from the network model module 140 to build the indirect data lineage. The network model module 140 is a machine-learning-based module that leverages Naïve Bayesian network model techniques to build indirect connections between data objects that exist in the overall computing environment. For example, the network model module 140 receives object data from metadata information 142 and, based on a network model algorithm, either creates new parent-child relationships or updates existing parent-child relationships, which are then parsed by the indirect lineage translator 138 and loaded into the parent data 144 and child data 146 repositories. Further detail on the operation of the network model module 140 is provided later in this specification.

The text mining module 132 uses, in some embodiments, NLTK Count Vectorization-based techniques to parse incidents and change-related data sets from the incident and change management repository 104 to obtain meaningful sets of words from ticket descriptions in the repository 104, and the module 132 loads this data into the staging area module 134 for further transmission into the incident data 148 repository. This process is described in detail in a later section of this specification.

The intuitive user interface 166 generates a graphical user interface for display on, e.g., a remote computing device (not shown) which allows a user at the remote computing device to visualize the data lineage (i.e., direct, indirect) as well as impacts and impact ranks if a change to one or more data objects were to happen based on, e.g., the incident or change management tickets as stored in the incident and change management repository 104. This process is described in detail in a later section of this specification.

Figure 2A:
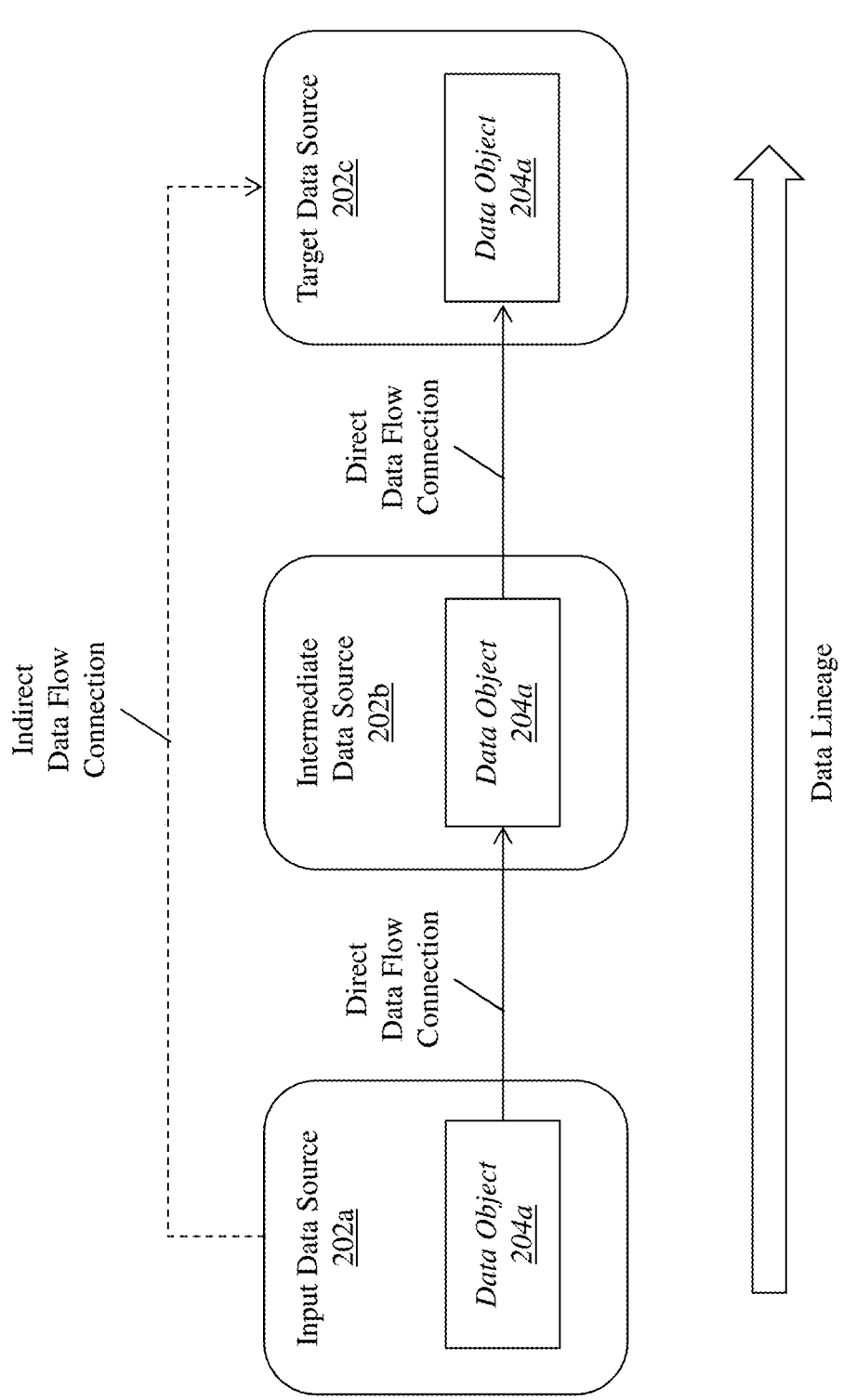
FIG. 2A is a diagram of an exemplary data lineage showing direct relationships and indirect relationships between data sources.

FIG. 2A is a diagram of an exemplary data lineage showing direct relationships and indirect relationships between data sources. As shown in FIG. 2A, an input data source 202*a* is connected to an intermediate data source 202*b* via a data flow connection that comprises data object 204*a*. For example, input data source 202*a* receives as input one or more data elements that comprise data object 204*a* and as part of, e.g., an application workflow, input data source 202*a* transmits data object 204*a* to the intermediate data source 202*b*. Then, intermediate data source 202*b* further transmits data object 204*a* to target data sources 202*c* via a data flow connection—so that the overall data lineage comprises (i) a direct connection between input data source 202*a* and intermediate data source 202*b*, (ii) a direct connection between intermediate data source 202*b* and target data source 202*c*, and (iii) an indirect connection between input data source 202*a* and target data source 202*c*. If data object 204*a* is changed (e.g., due to code changes or data modification), then each of the data sources 202*a*, 202*b*, and 202*c* are impacted and must be updated or reconfigured accordingly. Therefore, it is important to understand the overall data lineage for the data object 204*a* to assess potential impact on the overall system if changes to data object 204*a* are contemplated, and to ensure that planned changes will not cause unexpected or unintended system performance issues.

Figure 2B:
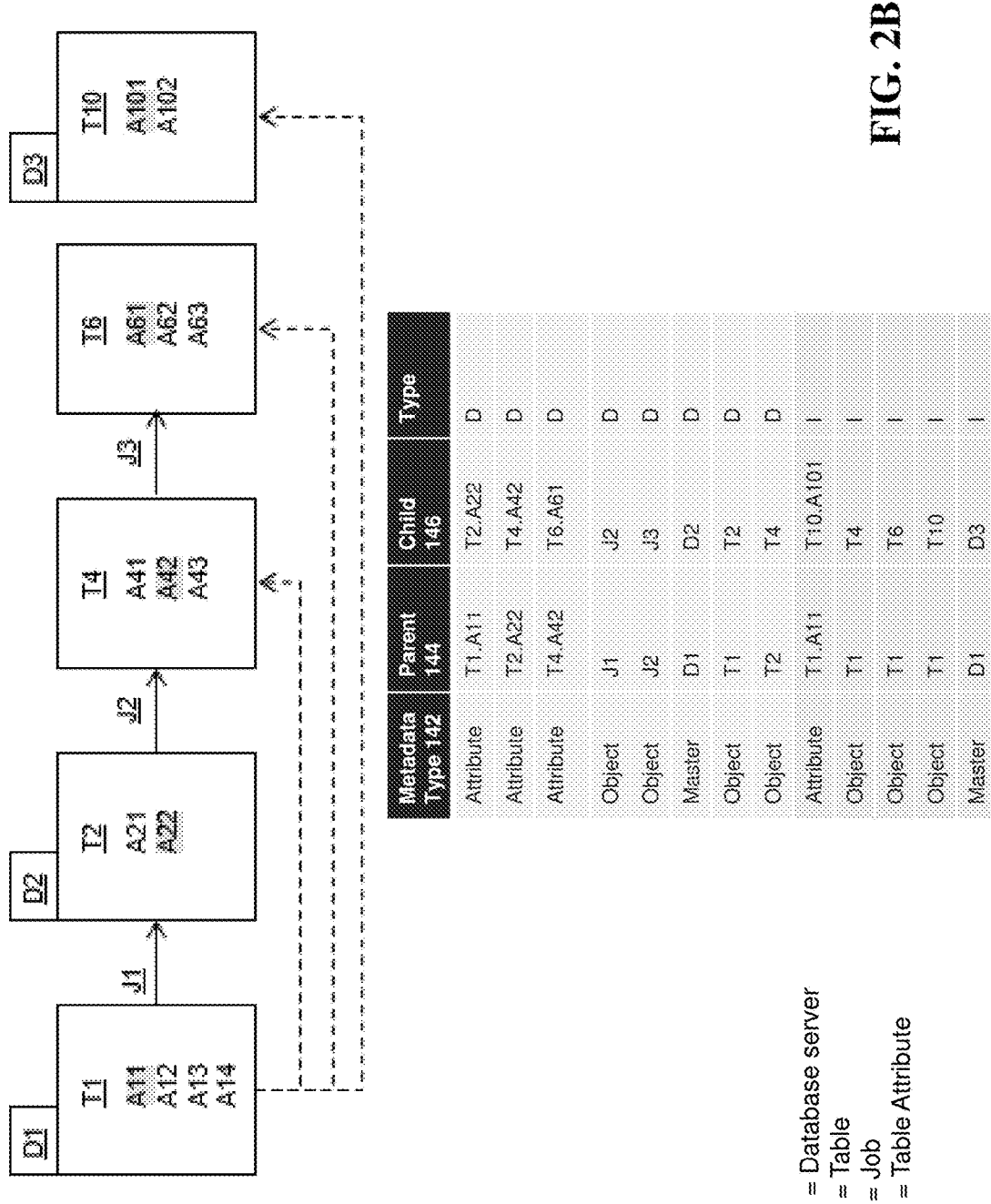
FIG. 2B is a diagram of an exemplary data lineage showing direct relationships and indirect relationships between data sources.

FIG. 2B is a diagram of an exemplary data lineage showing direct relationships and indirect relationships between data sources. As shown in FIG. 2B, a plurality of database servers D1, D2, D3 have data objects (i.e., Tables T1, T2, T4, T6, T10) that share direct and indirect relationships with each other. For example, there is a direct relationship between T1 in D1 and T2 in D2, based upon attribute A11 in T1 and attribute A22 in T2 (e.g., Job J1 can run to transfer attribute A11 to attribute A22). And, because Job J2 can run to transfer attribute A22 in T2 to attribute A42 in T4, there is an indirect relationship between attribute A11 in T1 and attribute A42 in T4 (shown by the dotted line). The direct lineage translator 136 programmatically parses metadata about data objects as received from data sources 102*a*-102*n* and stores the parsed information in the metadata information 142, parent data 144 and child data 146. As shown in the table in FIG. 2B, the type flag indicates the type of relationship (i.e., D=Direct; I=Indirect).

Indirect relationships are built using the network model module 140. As mentioned previously, the data generated by the module 140 is parsed by the indirect lineage translator 138 and loaded into the parent data 144 or the child data 146 (i.e., as either updates to the existing records or newly created data sets). The network model module can use a Bayesian, long short-term memory (LS™), or other type of artificial intelligence network model to build the indirect relationships. In one example, the module 140 receives the following inputs:

Data element classification, e.g., Master/Object/Attribute ID, Classification Code, etc.;
Data element properties, e.g., Master/Object/Attribute Property ID, Property Name/Type, etc.
Data Lineage Information, e.g., parent/child information from data repositories 144, 146.

The network model module 140 identifies both obvious and hidden dependencies between the data elements based upon the above inputs, logs the hidden dependencies and rebuilds the data lineage for the indirect relationships based upon its identification of the dependencies and stores the data lineage information in the parent data 144 and child data 144 repositories.

Figure 2C:
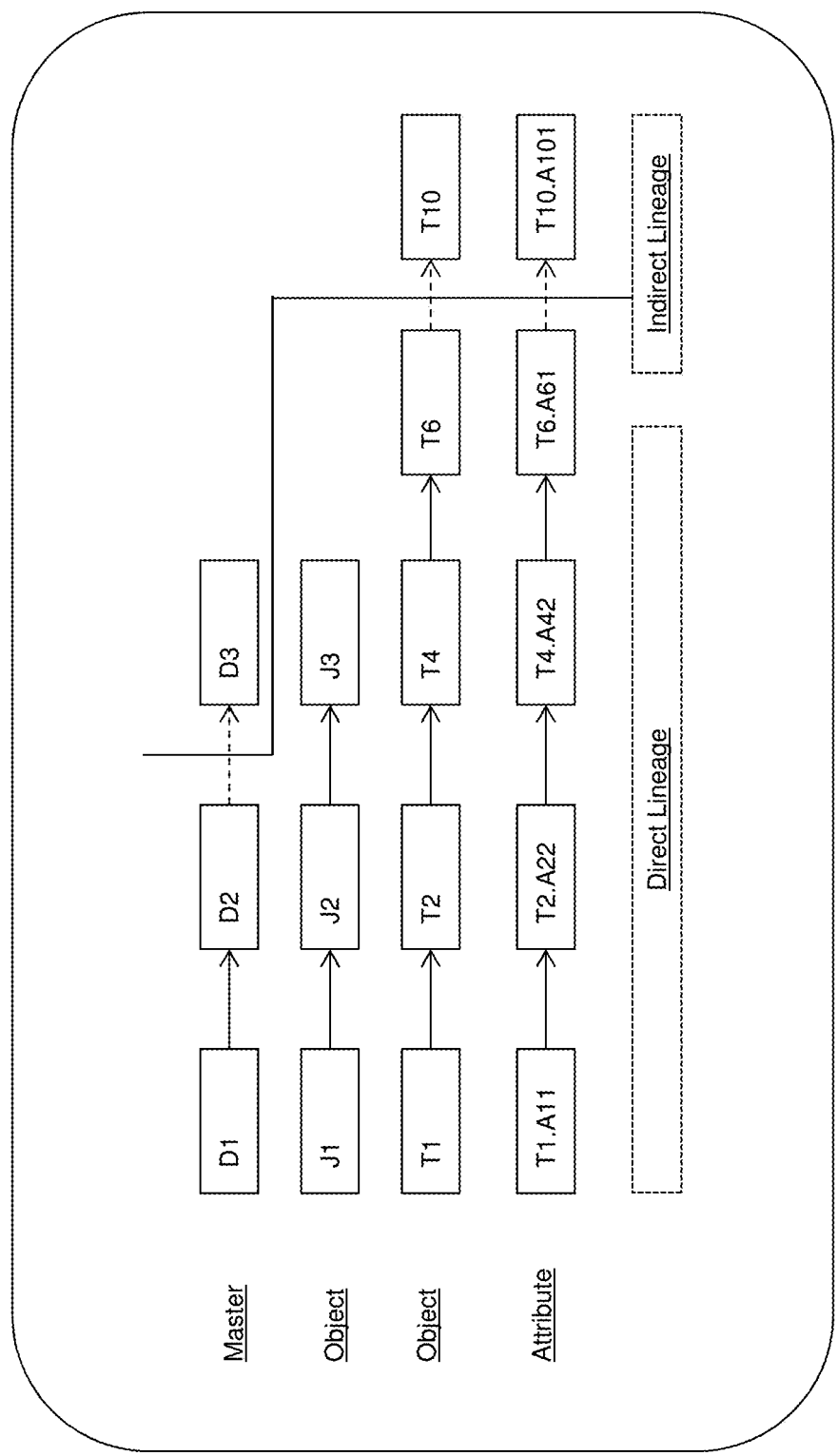
FIG. 2C is a diagram of an exemplary graphical user interface depicting the direct and indirect relationships between the various data objects.

Then, the network model module 140 can generate a graphical user interface of the data lineage using the intuitive UI 166. An exemplary graphical user interface is shown in FIG. 2C, where the direct and indirect relationships between the various data objects (master, object, attribute information) are displayed in an easy-to-understand manner, enabling a user to quickly and efficiently understand the relationships between data objects.

Once the data lineage is generated, the system can collect information about data object issues, or proposed or soon-to-be-implemented changes to data objects, from incident and change management repository 104—in order to assess the impact of such changes on the existing data lineage information, and to provide ranking of impact risks to the overall computing environment health and stability when the changes occur.

To do so, the text mining module 132 captures relevant information associated with incident tickets and/or planned changes from the repository 104. In some embodiments, incident tickets can be manually or automatically generated whenever there is an unintended behavior within the computing environment leading to some failure or halt of some processing. Change tickets can be raised by various enterprise and/or development users whenever they intend to enact some changes to data objects within the production computing environment. In some embodiments, a change ticket also captures other types of information—including who is requesting the change, when, why, nature of change, change details and when the change needs to be done.

The text mining module 132 typically performs three tasks:

Capture incident and change details from the repository 104 and store them in the incident data 148 repository;
Read natural text fields of the incident and change tickets in the repository 104 to extract the Data Manipulation Language (DML) and Data Definition Language (DDL) statements; and
Insert/update (and thereby build) the trained data 150 repository.

Figure 3B:
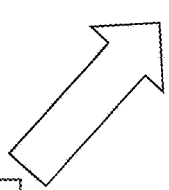
FIG. 3B is a refined incident data set generated by the text mining module.

First, the text mining module 132 parses and loads basic incident data into the incident data 148 repository. FIG. 3A is an exemplary table showing a data structure for incident data in the repository 148. The incident data is then used by the module 132 to generate a refined incident data set as shown in FIG. 3B.

The refined incident data set is then associated with the existing data lineage information (in metadata information 142, parent data 144, and child data 146) to generate the trained data 150, that can then be applied to new incident ticket information by the predict and ranking module 154 to determine an impact of the incident and rank the impact. FIG. 3C is an exemplary diagram showing how the trained data 150 is generated and then used by the system to predict impact of subsequent incident ticket information.

However, when there may be no history associated with a particular incident (i.e., there may be insufficient data lineage information to predict an impact), the system can use the trained data 150 to cluster values and pick up other data lineage information. FIG. 3D is an exemplary diagram showing how trained data 150 is clustered to identify potential impacts. In this example, the planned change may comprise inserting a value into T1.A11. As shown in FIG. 3D, a prior change C123 completed such an insert with no issues. However, that same change C123 caused an update of T4.A42 (incident 1123) to fail. Therefore, when a subsequent change C234 is entered into the system, which calls for inserting a value into T1.A11, the system can cluster the prior entries to predict that change C234 will cause failure of T4.A42.

Figure 4A:
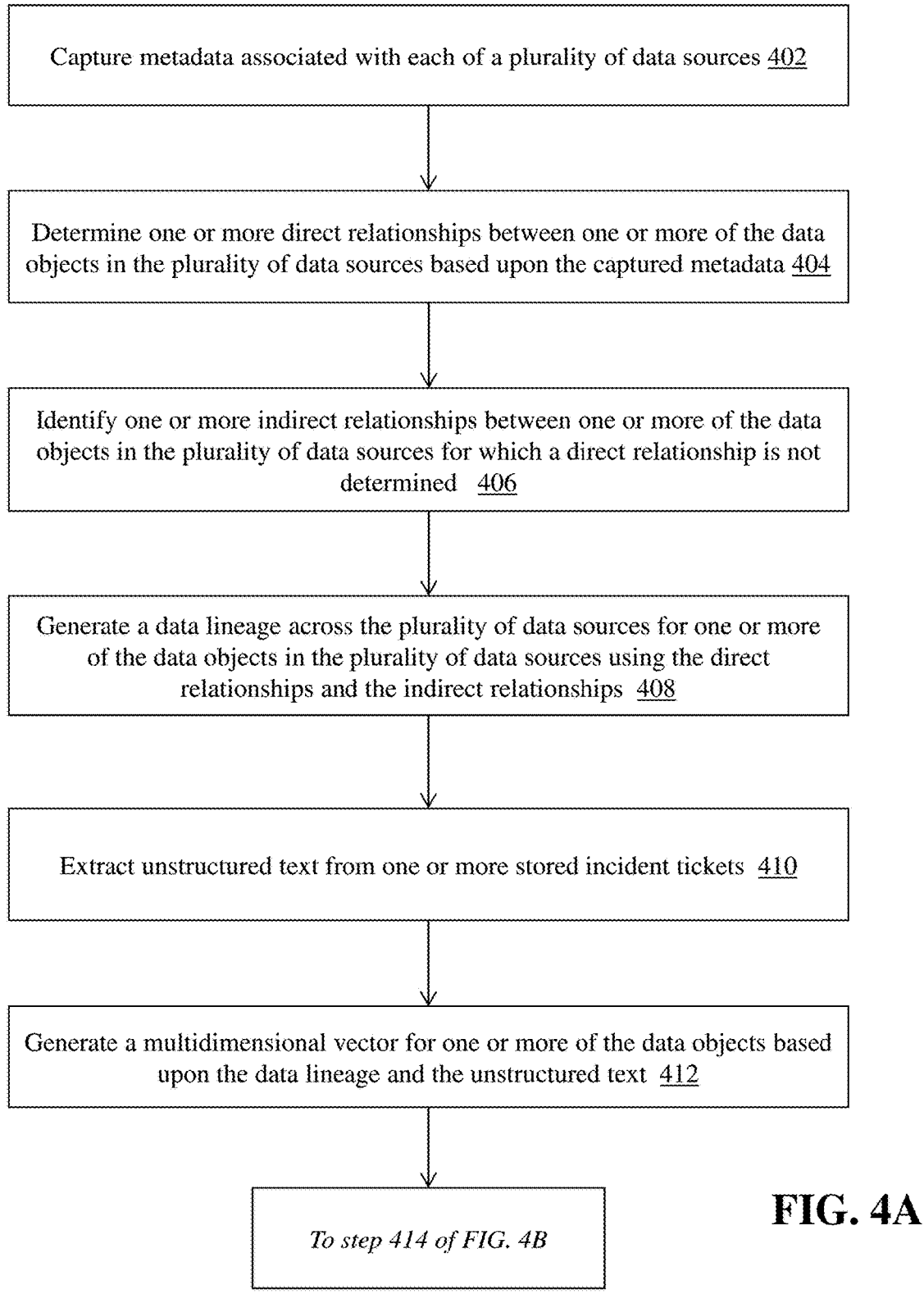
FIGS. 4A and 4B comprise a flow diagram of a computerized method of data lineage identification and change impact prediction in a distributed computing environment.
Figure 4B:
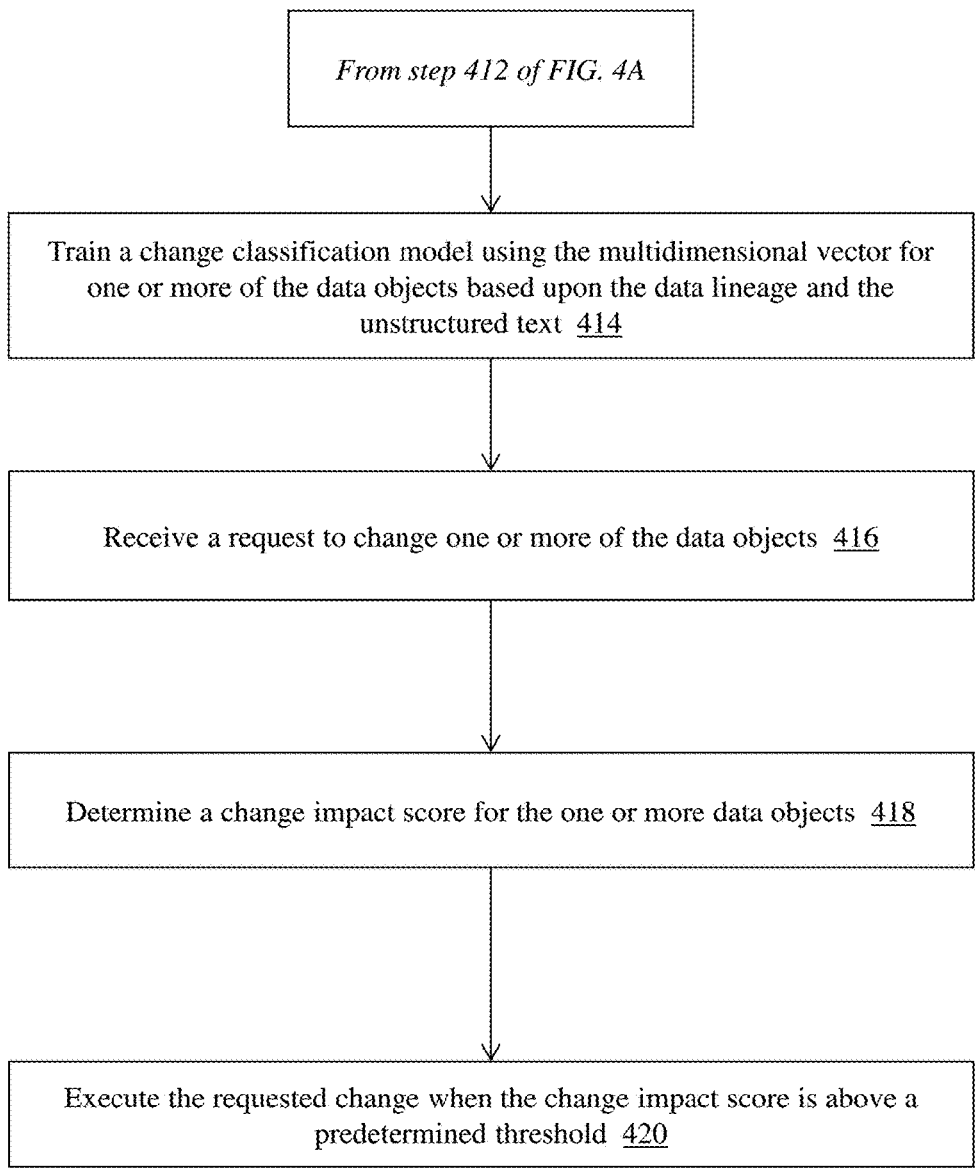

FIGS. 4A and 4B comprise a flow diagram of a computerized method of data lineage identification and change impact prediction in a distributed computing environment, using the system of FIG. 1A. The metadata capture module 108 captures (402) metadata associated with each of a plurality of data sources 102a-102n. For example, the metadata capture module 108 establishes a communication session with each of the data sources 102a-102n and analyzes the data objects stored in and/or used by the data sources 102a-102n to determine metadata associated with the sources and objects. The metadata can include elements such as (but not limited to) data type, data length, data size, data object type, data object attributes, data format, data source identifier, data object identifier, application workflow identifier, business domain, and so forth. The metadata capture module 108 can store the metadata in database 116.

The data lineage identification module 110 determines (404) one or more direct relationships between one or more of the data objects in the plurality of data sources based upon the captured metadata. In one example, the data lineage identification module 110 determines whether a data object in each of a plurality of data sources shares common attributes (e.g., data size, data object identifier) and/or is part of the same data flow through the data sources. For example, the data lineage identification module 110 can analyze the metadata to determine that a data object in data source 102a is connected via data flow to a data object in data source 102b, and therefore the data lineage identification module 110 determines that a direct relationship exists between the data objects in each data source 102a, 102b—meaning that a change to the data object in source 102a would impact the data object in data source 102b. Also, it should be appreciated that the data lineage identification module 110 can determine direct relationships for an entire data workflow (e.g., that is associated with a business domain or application functionality)—for example, as shown in FIG. 2A, the data lineage identification module 110 uses the captured metadata to determine that a direct relationship exists between data object in input data source 202a and data object in intermediate data source 202b, and between data object in intermediate data source and data object in target data source 202c.

In some embodiments, the data lineage identification module 110 also establishes dependencies across different data sources and/or environments using the captured metadata. For example, a first data source 102a (i.e., a web portal) may depend upon a lower-level data source 102b (i.e., a business intelligence (BI) repository) during execution of an application workflow, due to pre-established links and/or references in data objects of the web portal that reference data objects in the BI repository. The data lineage identification module 110 can determine a direct relationship exists between the web portal and the BI repository by examining the references (or metadata associated with the references).

Based upon the identification of direct relationships, the data lineage identification module 112 identifies (406) one or more indirect relationships between one or more of the data objects in the plurality of data sources for which a direct relationship is not determined. As noted above in the case of FIG. 2A, the data lineage comprises a series of direct relationships between data sources 202a, 202b, and 202c. However, this also means that an indirect relationship between data source 202a and 202c exists—but the data lineage identification module 112 may not be able to directly use the metadata to determine the existence of the indirect relationship. As a result, the data lineage identification module 112 establishes indirect relationships between unconnected data sources using artificial intelligence techniques—such as running a Bayesian Network model on the direct relationships and associated information (e.g., data object information, data source information, metadata). A Bayesian Network model is a statistical model used by the data lineage identification module 110 to represents the direct relationships (including data objects, dependencies, etc.) in a graphical format (e.g., a directed acrylic graph). Using the output of the Bayesian Network model, the data lineage identification module 112 can determine the existence of indirect relationships between data objects (e.g., based upon common dependencies, related data sources, and the like).

Once the data lineage identification module 110 has determined the direct relationships and identified the indirect relationships as described above, the module 110 generates (408) a data lineage across the plurality of data sources for one or more of the data objects in the plurality of data sources using the direct relationships and the indirect relationships. In some embodiments, the data lineage can be associated with a specific data object (or set of data objects), a set of data sources, an application, and/or a business domain. For example, a business domain or an application provided by an enterprise computing system may involve many different data flows that involve data objects across a variety of data sources. The business domain can thus comprise a plurality of data lineages (each having direct relationships and indirect relationships between data objects in data sources) that generally define how certain data flows via data objects through the data sources, from input to target. Having visibility into the overall data lineage for a particular piece of data as related to a specific business domain helps greatly with determining change impact assessment, as is explained below.

Using the data lineage, the server computing device 106 can train a classification model to predict the impact of changes to the underlying data objects on the computing environment and/or on specific business domains or applications. First, the classification model training module 112 extracts (410) the unstructured text (and in some embodiments, data source metadata and/or data object metadata) from the incident ticket data 118 stored in the database 116. For example, the module 112 can extract the unstructured text using techniques such as, e.g., sentence splitting and tokenization to convert the unstructured text into sub-segments that are able to be interpreted by the classification model. The module 112 can match the extracted unstructured text with the data lineage information previously generated by the data lineage identification module 110 by, e.g., matching metadata (such as data object identifier, data object name, data source identifier, data source name, business domain, application, etc.) between the data lineage and the incident ticket. For example, an incident ticket may include a data object identifier along with a text string that identifies a specific error message caused by, e.g., a data type mismatch. The module 112 can determine that the data object identifier matches a data object identifier of a data object associated with one or more data lineages stored in database 116.

The classification model training module 112 then generates (412) a multidimensional vector for one or more of the data objects based upon the data lineage associated with the data objects and the unstructured text from one or more incident tickets associated with the data objects. For example, the multidimensional vector can define a feature set of the data object based upon the data lineage and the unstructured text. The multidimensional vector is in a form that is usable as input to the classification model. In one embodiment, the classification model training module 112 can perform NLTK Count Vectorization and Feature Extraction, including one or more techniques to generate the multidimensional vector—such as loading features from a dictionary, feature hashing (using naïve Bayes Multinomial or Chi_Square techniques), and/or text extraction (e.g., bag of words, sparsity, common vectorizer, TF-IDF term weighting). The multidimensional vector comprises a set of integers for each data object that define features such as frequency, depth, and penetration of the data object within a particular business domain, application, and/or set of data sources. Using specific characteristics such as frequency, depth, and penetration, the module 112 can further refine the feature set for specific data objects using, e.g., Random Forest techniques like mean decrease impurity and mean decrease accuracy—to identify the most relevant features in the feature set for change impact prediction.

Turning to FIG. 4B, once the classification model training module 112 has generated multidimensional vectors for the data object(s) as described above, the module 112 trains (414) a classification model using the multidimensional vector(s) for one or more of the data objects based upon the data lineage for the data object and the unstructured text associated with the incident ticket data. In one embodiment, the module 112 trains a multinomial regression model using the above-referenced data that provides a prediction of failure of one or more data sources, applications, and/or business domains in the event that the corresponding data object changes. For example, the trained classification model can use as input the multidimensional vector(s) associated with a data object and execute to determine a value associated with the predicted impact (i.e., likelihood of failure) that a change to the input data object would have on the production system. In some embodiments, the classification model training module 112 implements a feedback loop as part of the trained classification model—meaning that the input and output from prior executions of the model are added into a subsequent training set that is used to further train the model, thereby producing a refined classification model that is self-learning and can handle new data objects, data lineages, and new issues or incidents that could occur in the system.

The trained classification model is transmitted by the classification model training module 112 to the data object change impact module 114, which uses the trained model for change impact prediction, ranking and change execution. The client computing device 103 generates a request to change one or more of the data objects in at least one of the data sources 102a-102n. For example, a developer or systems engineer may be considering a software change to, e.g., an application or business domain executed by the production computing environment—and the software change can include one or more changes to data objects used by the application or business domain (such as removing a field from a database table, changing a type of a data element, and the like). It can be appreciated that, due to the data lineage of data objects, the example changes noted above could impact several different data sources, application functions, or business domains—which could result in data errors, downtime, or loss of functionality in the system. The developer can generate a scenario that includes the prospective change to the data object at client computing device 103 and submit the scenario to the server computing device 106 as part of a request to change one or more of the data objects.

The data object change impact module 114 receives (416) the change request from the client computing device 103 and determines (418) a change impact score for the one or more data objects referenced in the change request.

To determine the change impact score, the data object change impact module 114 utilizes the following algorithm:

$$IR=R\times(D+W)$$

where R relates to the direct and indirect relationships associated with the data object, D relates to the depth of the affected data object from the input data source (that is, where the data object is first introduced to the system), and W relates to the incident ticket data. IR is the impact ranking of the data object change, also called the change impact score. Generally, higher change impact scores mean a more significant impact on the production system.

R is calculated by considering weighted averages of the direct and indirect relationships as follows: R=weighted average(# of direct relationships)+weighted average(number of indirect relationships). For example, if the affected data object has a direct data flow relationship with two data sources, and an indirect relationship with one data source, the module 114 determines R using these relationships.

D is calculated to identify the depth (or distance) from the input data source to the data source of the affected data object (i.e., the number of 'hops' from input data source to affected data source). Using the example of FIG. 2A, data source 202a is the input data source and data source 202c is the target data source, with intermediate data source 202b in between. If the data object at target data source 202c is going to be changed, the module 114 calculates D=2 (i.e., source 202a→data source 202b is 1 hop, and data source 202b→data source 202c is 1 hop).

W is determined based upon the following:

$$W=L_I\times C$$

where $L_I$ is the level and impact associated with the incident ticket data, and C is the count of all data sources in the data lineage for the data object. Table 1 below includes example levels and impact values for incident tickets, that can be used by the module 114:

| Level | High (H) Impact | Medium (M) Impact | Low (L) Impact |
|-------|-----------------|-------------------|----------------|
| 1 | 12 | 11 | 10 |
| 2 | 9 | 8 | 7 |
| 3 | 6 | 5 | 4 |
| 4 | 3 | 2 | 1 |

For example, if the affected data object has ten different data sources in its lineage plus the affected data source, and the incident ticket data indicates the level/impact is 3H, then:

$$W=(10+1)\times 6=66$$

Therefore, using the methodology described above, the data object change impact module 114 determines the change impact score (or impact ranking) for the data object change provided in the change request. FIG. 5 is an exemplary ranking of change impacts according to the above algorithm.

The data object change impact module 114 then executes (420) the requested data object change when the change impact score is below a predetermined threshold. For example, if the change impact score is low—indicating minimal impact to the production system—the data object change impact module 114 executes the requested change by generating programmatic instructions that are transmitted to the data source (e.g., data source 102a) that stores the affected data object as identified in the request. An example might be changing a database table column from a CHAR type to a VARCHAR type. The module 114 generates programmatic instructions (e.g., a SQL UPDATE command to a SQL database at data source 102a) and transmits the instructions to the data source 102a. The data source 102a then executes the programmatic instructions to change one or more of a data structure or a data type of the data object—in the above example, the data source 102a runs the SQL UPDATE command to change the data type of the database table column from CHAR to VARCHAR. Although other data sources in the data lineage may still have the data object stored as a CHAR, this data type mismatch typically would not cause failures in production applications or business domains—as most (if not all) data can still be stored in the data objects that have not been changed across the data sources.

In another example, the change might be removing a database table column altogether. The module 114 could determine that the change impact score associated with such a change is high—indicating severe impact to the production system, in that if an application workflow attempts to write a value to a database column that no longer exists, it could cause significant errors or loss of functionality. Therefore, the module 114 can determine not to execute the requested change due to the impact ranking.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for data lineage identification and change impact prediction in a distributed computing environment, the system comprising:
a plurality of distributed server computing devices that coordinate over a network to:
capture metadata associated with each of a plurality of data sources coupled to the plurality of distributed server computing devices, the metadata comprising technical attributes that define data objects stored in the plurality of data sources;
determine one or more direct relationships between one or more of the data objects in the plurality of data sources based upon the captured metadata;
identify, using an artificial intelligence machine learning model on the metadata, one or more indirect relationships between one or more of the data objects in the plurality of data sources for which a direct relationship is not determined;

generate a data lineage across the plurality of data sources for one or more of the data objects in the plurality of data sources using the direct relationships and the indirect relationships, the data lineage comprising one or more data flow connections between an input data source, one or more intermediate data sources, and a target data source;

generate a multidimensional vector for one or more of the data objects stored in the plurality of data sources based upon the data lineage and unstructured text extracted from one or more incident tickets associated with the data objects, the multidimensional vector comprising a change impact feature set for the data objects;

train a change classification model using the multidimensional vectors to predict a change impact score for each data object and rank the data objects based upon the change impact scores;

receive a request to change a data object stored in one of the data sources;

determine, by executing the change classification model, a change impact score for the data object identified in the request; and when the change impact score is below a predetermined threshold, execute the requested change by generating programmatic instructions that are transmitted to the data source that stores the data object identified in the request, wherein the data source executes the programmatic instructions to change one or more of a data structure or a data type of the data object.

2. The system of claim 1, wherein the plurality of data sources comprise at least one of databases, entity relationship models, extract transform and load (ETL) systems, extract load and transform (ELT) systems, business intelligence reporting systems, and web configuration systems.

3. The system of claim 1, wherein the direct relationships comprise a data flow connection associated with a data object from a first data source to a second data source.

4. The system of claim 1, wherein the indirect relationships comprise a data flow connection associated with a data object from a first data source to a second data source via one or more intermediate data sources between the first data source and the second data source.

5. The system of claim 1, wherein the artificial intelligence machine learning model used to identify one or more indirect relationships comprises a Bayesian network model.

6. The system of claim 1, wherein the change impact feature set is based upon the relationships in the data lineage associated with the data object, a depth of the data object in the data lineage, and one or more attributes of the incident tickets associated with the data object.

7. The system of claim 1, wherein the change classification model is a multinomial regression model.

8. The system of claim 1, wherein the plurality of distributed server computing devices uses the data lineage to identify a mismatch between a data object in a first data source of a relationship and a data object in a second data source of a relationship.

9. The system of claim 8, wherein the mismatch comprises one or more of: a data type mismatch, a size mismatch, or an attribute mismatch.

10. The system of claim 1, wherein determining a change impact score for the data object identified in the request comprises:

capturing metadata associated with the data object identified in the request;

generating a multidimensional vector for the data object identified in the request based upon a data lineage of the request and the unstructured text extracted from the incident tickets; and executing the change classification model using, as input to the change classification model, the multidimensional vector for the data object identified in the request to predict a change impact score for the data object.

11. The system of claim 10, wherein the plurality of distributed server computing devices train the change classification model using the input vector and the predicted change impact score as feedback.

12. A computerized method of data lineage identification and change impact prediction in a distributed computing environment, the method comprising:

capturing, by a plurality of distributed server computing devices that coordinate over a network, metadata associated with each of a plurality of data sources coupled to the plurality of distributed server computing devices, the metadata comprising technical attributes that define data objects stored in the plurality of data sources;

determining, by the plurality of distributed server computing devices, one or more direct relationships between one or more of the data objects in the plurality of data sources based upon the captured metadata;

identifying, by the plurality of distributed server computing devices using an artificial intelligence machine learning model on the metadata, one or more indirect relationships between one or more of the data objects in the plurality of data sources for which a direct relationship is not determined;

generating, by the plurality of distributed server computing devices, a data lineage across the plurality of data sources for one or more of the data objects in the plurality of data sources using the direct relationships and the indirect relationships, the data lineage comprising one or more data flow connections between an input data source, one or more intermediate data sources, and a target data source;

generating, by the plurality of distributed server computing devices, a multidimensional vector for one or more of the data objects stored in the plurality of data sources based upon the data lineage and unstructured text extracted from one or more incident tickets associated with the data objects, the multidimensional vector comprising a change impact feature set for the data objects;

training, by the plurality of distributed server computing devices, a change classification model using the multidimensional vectors to predict a change impact score for each data object and rank the data objects based upon the change impact scores;

receiving, by the plurality of distributed server computing devices, a request to change a data object stored in one of the data sources;

determining, by the plurality of distributed server computing devices by executing the change classification model, a change impact score for the data object identified in the request; and when the change impact score is below a predetermined threshold, executing, by the plurality of distributed server computing devices, the requested change by generating programmatic instructions that are transmitted to the data source that stores the data object identified in the request, wherein the data source executes the programmatic instructions to change one or more of a data structure or a data type of the data object.

13. The method of claim 12, wherein the plurality of data sources comprise at least one of databases, entity relationship models, extract transform and load (ETL) systems, extract load and transform (ELT) systems, business intelligence reporting systems, and web configuration systems.

14. The method of claim 12, wherein the direct relationships comprise a data flow connection associated with a data object from a first data source to a second data source.

15. The method of claim 12, wherein the indirect relationships comprise a data flow connection associated with a data object from a first data source to a second data source via one or more intermediate data sources between the first data source and the second data source.

16. The method of claim 12, wherein the artificial intelligence machine learning model used to identify one or more indirect relationships comprises a Bayesian network model.

17. The method of claim 12, wherein the change impact feature set is based upon the relationships in the data lineage associated with the data object, a depth of the data object in the data lineage, and one or more attributes of the incident tickets associated with the data object.

18. The method of claim 12, wherein the change classification model is a multinomial regression model.

19. The method of claim 12, wherein the plurality of distributed server computing devices uses the data lineage to identify a mismatch between a data object in a first data source of a relationship and a data object in a second data source of a relationship.

20. The method of claim 19, wherein the mismatch comprises one or more of: a data type mismatch, a size mismatch, or an attribute mismatch.

21. The method of claim 12, wherein determining a change impact score for the data object identified in the request comprises:
   capturing metadata associated with the data object identified in the request;
   generating a multidimensional vector for the data object identified in the request based upon a data lineage of the request and the unstructured text extracted from the incident tickets; and
   executing the change classification model using, as input to the change classification model, the multidimensional vector for the data object identified in the request to predict a change impact score for the data object.

22. The method of claim 21, further comprising training the change classification model using the input vector and the predicted change impact score as feedback.

* * * * *

UNITED STATES PATENT AND TRADEMARK OFFICE
CERTIFICATE OF CORRECTION

PATENT NO. : 10,445,170 B1
APPLICATION NO. : 16/197774
DATED : October 15, 2019
INVENTOR(S) : Subramanian et al.

Page 1 of 1

It is certified that error appears in the above-identified patent and that said Letters Patent is hereby corrected as shown below:

On the Title Page

Item (72), Line 7, delete "Karnataka" and replace it with "Bengaluru"

Signed and Sealed this
Thirteenth Day of October, 2020

Andrei Iancu
*Director of the United States Patent and Trademark Office*